Jan. 16, 1951    M. A. ZIMMERMAN    2,538,548
REVERSING TAPPING HEAD

Filed Aug. 14, 1945    2 Sheets-Sheet 1

INVENTOR.
MERRITT A ZIMMERMAN,
BY
Justin W. Macklin,
Atty.

Jan. 16, 1951　　　M. A. ZIMMERMAN　　　2,538,548
REVERSING TAPPING HEAD

Filed Aug. 14, 1945　　　　　　　　　　2 Sheets-Sheet 2

INVENTOR.
MERRITT A. ZIMMERMAN,
BY
Justin W Macklin,
Atty

Patented Jan. 16, 1951

2,538,548

UNITED STATES PATENT OFFICE 2,538,548

REVERSING TAPPING HEAD

Merritt A. Zimmerman, Cleveland, Ohio

Application August 14, 1945, Serial No. 610,789

4 Claims. (Cl. 10—136)

This invention relates to mechanism for driving screw forming taps, and has for its essential objects simplicity of construction, cheapness of manufacture and effectiveness and durability in operation.

In the use of driving mechanisms for screw taps, it is desirable to cause the thread cutting under effective speeds suitable to the tap and material, and to reverse the rotation for backing out or withdrawing the tap from the threaded hole.

Heretofore, various clutches and drives have been provided for such uses. Many of these are cumbersome, subject to heating when in use and afford difficulty in controlling the application of power to the comparatively delicate tool, namely, the tap itself.

It is desirable to cause the tap to enter the hole to be threaded with a gentle starting pressure, and to effect the driving application of power without unduly increasing axial pressure at any time throughout the thread cutting operation. Likewise, it is desirable to withdraw the tap from the threaded hole by reversing and without application of sufficient axial pressure such as might cause drag or distortion of the threads, particularly as the tap is backed out of the last turn or two of the finished threads.

Other objects of my invention, therefore, include the provision of a compact reversing clutch suitable for attachment to the spindle of the lathe, drill press or like tool, and which, upon axial pressure in the direction of advancing the tap for thread cutting, shall smoothly and effectively turn the tap at a reduced speed, substantially below that of the spindle.

A further object is to disconnect the driving elements and reverse the rotation of the tap, turning it at a higher speed than that of the tapping operation, and which may be effected by merely reversing the axial pressure on the driving spindle.

A more specific object is to so arrange such a tapping head that by the use of planetary friction rollers and suitable bearing surfaces therefor, the axial mountings for one set of rollers may cause the reduced tapping speed driving action and a similar set of rollers within the same head may reverse the action to drive the tap by merely shifting the direction of pressure, freeing the first set of rollers and engaging the second set upon slight axial movement of the spindle.

Still another specific object includes connecting the effective friction surface for one set of rollers with that for the other set, and of providing a manual control in the form of a laterally extending rod or arm by which the tapping operation may be under the sensitive reaction of a skilled operator, if desired.

The method of accomplishing the above and other objects are set forth in the following specification and in the drawings to which the description relates.

A conventional socket, which may be of any suitable form, is shown at 1 as of the short tapered socket type for removably attaching tools to the driving spindle indicated at S which may be the spindle of a drill press.

Figure 2:
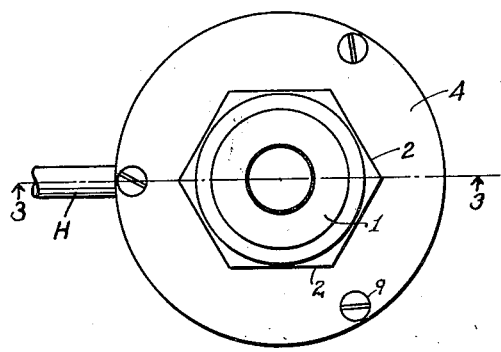
Fig. 2 is a plan of the same.
Figure 1:
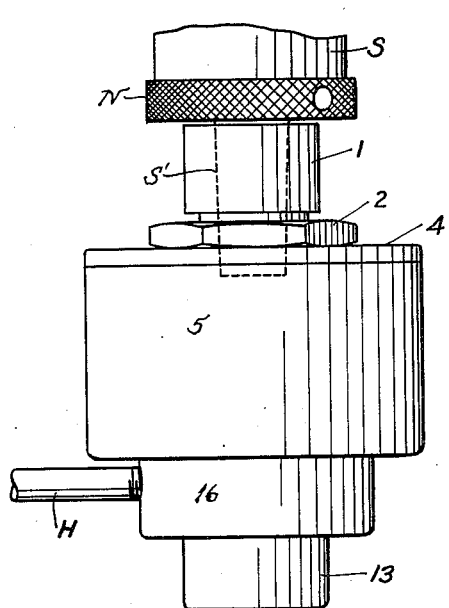
Fig. 1 is a side elevation of my tapping head showing the spindle and tap in operation position.
Figure 3:
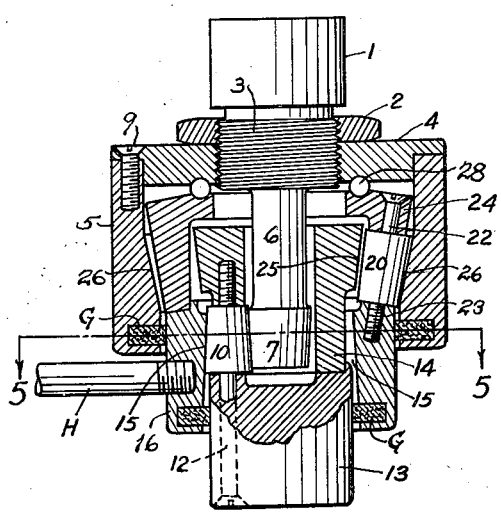
Fig. 3 is an axial section taken substantially on the plane indicated by the line 3—3 in Fig. 2, with parts in forward drive position.
Figure 5:
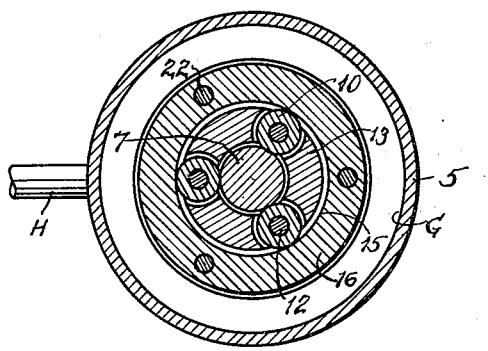
Fig. 5 is a transverse section taken on a plane indicated by the line 5—5 of Fig. 3.

A tapered shank S1 is indicated in broken lines (Fig. 1) as entering the socket which is formed on the tool, namely, the tapping head in the present case, and from which it may be removed by turning a spanner nut N to disengage it from its tight fit.

As shown, the socket 1 formed on the tool as a threaded extension 3 on which a locking nut 2 acts to nonrotatably secure the disk member 4, engaging the threads 3 and forming the upper wall of a cylindrical housing 5, the cylindrical portion of which may be attached to the disk 4 as by screws 9.

Rigidly projecting along the axis within the housing is a driving stud 6 carrying a tapered friction surface 7 at its inner end, adapted to engage driving rollers 10 which in turn are surrounded by and roll in a roller race 15 formed in a cylindrical member 16. The rollers 10 are mounted on shafts forming upward extensions of screws 12 threaded into a roller mounting member 14 so that as the rollers 10 rotate and revolve within the raceway 15, the axes of the rollers revolve around the axis of the spindle. Through the shaft screws 12 the tap carrying chuck 13 is revolved. This chuck is formed with any suitable socket or driving connection for the tap or like tool, designated T (Fig. 1), and there shown as engaging an opening to be threaded in a work piece designated W.

Thus the members 13 and 14, with the roller shaft elements in the form of the holding screws 12, comprise a roller cage.

The roller race ring 16 coacting with the rollers 10, carried in the cage structure just described, may be held against rotation by any suitable means, such as a handle H.

The upper portion of the roller cage is provided with an external roller face or race 25 coacting with the rollers 20 mounted in a roller cage member 24 and revolving on shafts 22. As before these roller shafts are in the form of screws 22 shown as threaded at 23 into the stationary race ring 16, and they serve to hold the members 24 and 16 and the rollers in an assembly unit. This cage is in the form of an annulus surrounding the upper portion of the chuck unit cage member 14 for the rollers 10, and it is shown as extending inwardly beneath the cap member 4 where a thrust bearing, indicated at 28, is shown as serving to hold the cage member 24 and the rollers 20 in normal contact with the roller race surface 26 within the member 5, and in a position to engage an external roller race 25 on the chuck unit member 14.

Grease retainers G and G are arranged between the stationary and rotating elements, being mounted in the ring members 5 and 16, respectively.

It should be noted that the driving shank member 1, the top and cylindrical portion 5 of the outer member as well as the rigid extension 6 and 7 at the center are firmly held together and rotate as a unit. The outer roller members 20 and the cage members 24 and 16 comprise a stationary unit, while the inner cage member consisting of the members 14, 13 and shaft screw elements 12 for the rollers 10 comprise an inner driven tool carrying unit.

As stated this latter tool carrying unit may be driven in opposite directions with relation to the spindle and at different speeds according to the following method of operation.

Assuming that the tap T has been placed in position in the chuck 13, the spindle S may be moved (lowered as in a drill press) to bring the tap into the hole in the work W. At the beginning of this engagement, slight continued downward pressure, that is, advancing pressure on the spindle, forces the taper driving surface 7 into tight frictional engagement with the rollers 10. Likewise, the surrounding race 15 of the member 16 and its rigidly connected member 24 are now held in engagement with the outer sides of these rollers 10 through the pressure exerted on the ball thrust bearing 28.

As the spindle rotates, the driving surface 7 revolves the rolls 10 in the outer stationary roller race 15, causing the axes of these rollers to revolve around the center axis, delivering to the chuck 13 and to the tap a rotative motion at a reduced speed. The action of the rollers in a stationary outer race reduces the speed by one half, and the driving surface 7 being of smaller diameter than the race 15 results in the driving element making several turns to one turn of the chuck and tap.

Figure 4:
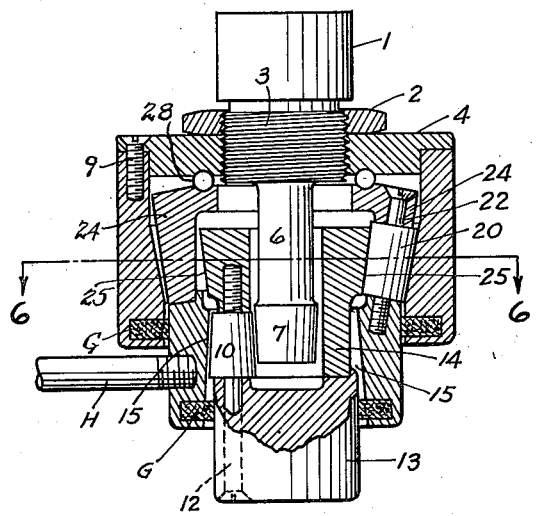
Fig. 4 is a similar section showing the same parts in the reversing position.
Figure 6:
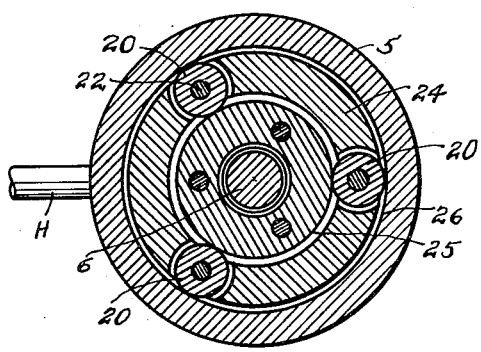
Fig. 6 is a section similar to Fig. 5, taken on a plane indicated by the line 6—6 in Fig. 4.

When desired to remove the tap by backing it out of the work, the spindle is moved, i. e., raised as shown in Fig. 4. The rollers 20 in the stationary unit cage are raised into contact with the roller surface 25 on the tap carrying unit 14, 13, etc. This raising or withdrawing motion of the spindle disengages the driving element 7 from the rollers 10, and the driving roller face 26 of the member 5 causes the rollers 20 to revolve around their axes. In this operation the driving effect of the rollers 20 delivers a one to one ratio around their individual stationarily held axes, and the diameter of the roller race 26 being greater than that of the inner race member 25 on the tap driving unit, the driving in this reversed direction in the proportions of roller races shown, is somewhat more than one and a half to one higher than the spindle speed.

During the tapping and the backing out operations, the control of the pressure of the spindle axially on the tap may be governed by the conditions required. The force needed for holding the handle H to keep the cage for the rollers 10 in relatively stationary position constitutes a means of warning against excessive pressures or speeds delivered to the tap.

From the foregoing description it will be seen that I have provided a compact roller drive which is positive in tapping and backing out operations and requires but slight pressures to render it effective, and that these pressures are applied in the normal axial direction consistent with the entering and cutting and backing out of the tap.

It will be seen that speed ratios may be varied by changing the sizes of roller and race diameters.

I have found in practice that the action of the rollers in such a clutch remains smooth over long periods of use, and that the device requires no adjustment or attention other than reasonable cleanliness and lubrication.

From the foregoing description it will be apparent that the objects given have been attained in an economical simple construction. Various modifications and embodiments may be made of my invention without departing from its purport and novelty as defined in the appended claims.

Having thus described my invention what I claim is:

1. In combination, an axially movable and rotatable spindle, a cutting tool adapted to advance as it cuts, a tool carrier for said tool adapted to be connected to the spindle and having driving rollers with revolving fixed axes therein, a conical roller surface coaxial with and fixed to the spindle for coacting with said driving rollers, a non-rotating reaction member having a roller surface surrounding and coacting with the tool carrier driving rollers during advancing and cutting operation of the tool, direction reversing rollers carried by the reaction member, an outside conical surface on the tool carrier for coacting with the reversing rollers, and an inside surface rotatably fixed with the spindle for engaging the reversing rollers and so positioned that as the spindle is retracted axially the reversing rollers are operatively engaged and the driving rollers are disengaged.

2. In combination, an axially movable and rotatable spindle, a threading tap and a tapping head for driving the tap while cutting and for withdrawing the same, and comprising driving and driven units adapted to be mounted upon the spindle and to carry the tap respectively, a reaction unit having planetary tapered rollers 20 carried thereby and having an internal tapered roller surface 15, manually controlled means connected with said reaction unit for holding the reaction unit against rotation, external and internal conical roller surfaces 7 and 26 on the driving unit and both relatively fixed with relation to the driving unit and thus rotatable with the spindle and converging toward the tap, tapered rollers 10 and shafts for each roller fixed on the tap-carrying driven unit and so positioned that movement of the spindle in the direction of the advancing and cutting of the tap causes driving engagement of the external roller driving surface 7 on the driving unit with the rollers 10 in the driven unit and causing these rollers to engage the internal surface 15 of the reaction unit, the driven unit having an external surface 25 inside of and spaced from the internal surface 26 of the driving unit, the reverse axial motion of the spindle acting to cause the internal roller surface 26 of the driving unit to drive the rollers 20 of the reaction unit against the driven unit surface 25 and reverse the direction of rotation of the driven unit.

3. A driving and driven means for the purposes described, comprising a hollow element adapted to attachment to a driving spindle and having a rigid axial projection, a driven element adapted for attachment to a thread-cutting tap, a relatively stationary reaction element, said elements being in axial alignment, two sets of planetary friction tapered rollers, one set mounted on the driven element and the other set mounted on the reaction element, inside and outside roller-contacting surfaces rigidly fixed on the hollow driving element and on said axial projection, respectively, an outside roller surface on the driven element coacting with one set of rollers arranged between it and the hollow element roller surface for rotation of the driven element in one direction, the second set of rollers coacting with the outside roller driving surface of the axial projection, and said second set of rollers each having its own fixed shaft bearing in the driven element, and a thrust bearing between the relatively stationary element and the driving element normally holding the set of rollers on the stationary reaction element in engagement with the inside roller driving surface thereon, the driven element being relatively axially movable with relation to the driving element to effect alternate driving engagement of the two sets of rollers.

4. A structure such as defined in claim 3 in which the rollers and their bearing surfaces are enclosed, there being provided a lubricant-retaining means coacting with said elements to close the space within the hollow element and around both sets of rollers.

MERRITT A. ZIMMERMAN.

REFERENCES CITED

The following references are of record in the file of this patent:

UNITED STATES PATENTS

| Number | Name | Date |
|---|---|---|
| 943,009 | Dorman | Dec. 14, 1909 |
| 1,618,301 | McClintock | Feb. 22, 1927 |
| 1,624,097 | Gensmer | Apr. 12, 1927 |